United States Patent [19]

Srinivasan

[11] Patent Number: 5,720,933
[45] Date of Patent: Feb. 24, 1998

[54] PROCESS FOR PREPARING CERAMIC FIBERS

[76] Inventor: Makuteswara Srinivasan, 227 Deerwood La., Grand Island, N.Y. 14072

[21] Appl. No.: 613,479

[22] Filed: Mar. 11, 1996

[51] Int. Cl.$^6$ .......................... C01B 31/36; C04B 35/565
[52] U.S. Cl. .......................... 423/345; 423/344; 423/412; 501/95.1
[58] Field of Search .......................... 423/345; 501/95.1

[56] References Cited

U.S. PATENT DOCUMENTS

| | | | |
|---|---|---|---|
| 3,161,473 | 12/1964 | Pultz | 501/95.1 |
| 4,492,681 | 1/1985 | Endou et al. | 423/345 |
| 4,640,830 | 2/1987 | Arakawa | 423/345 |
| 5,063,107 | 11/1991 | Birchall et al. | 501/95.1 |
| 5,167,881 | 12/1992 | Atwell et al. | 501/95.1 |
| 5,268,336 | 12/1993 | Deleeuw | 501/95.1 |
| 5,278,110 | 1/1994 | Toreki et al. | 501/95.1 |
| 5,283,044 | 2/1994 | Okamura et al. | 501/95.1 |

FOREIGN PATENT DOCUMENTS 310265  4/1989  European Pat. Off. .......... 423/345

*Primary Examiner*—Wayne Langel
*Attorney, Agent, or Firm*—Howard J. Greenwald

[57] ABSTRACT

A process for preparing silicon carbide fiber by the carbothermal reduction of silica fiber. In the first step of the process, a specified silica fiber is contacted with a source of elemental carbon to produce a reactant mass; the silica fiber is comprised of at least about 99.5 weight percent of silica, has a density of at least about 2.15 grams per cubic centimeter, has a diameter of from about 1 to about 100 microns and an aspect ratio of at least about 30. From about 3.2 to about 5.0 moles of carbon are present in the carbon source for each mole of the silica. The reactant mass is heated at a temperature of from about 1,400 degrees centigrade to about 2,300 degrees centigrade for at least about 0.5 hours.

15 Claims, 5 Drawing Sheets

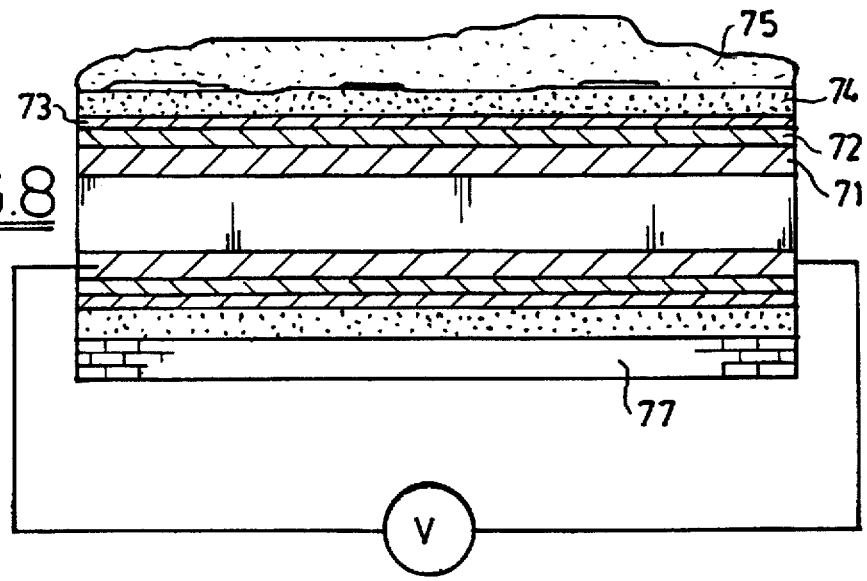
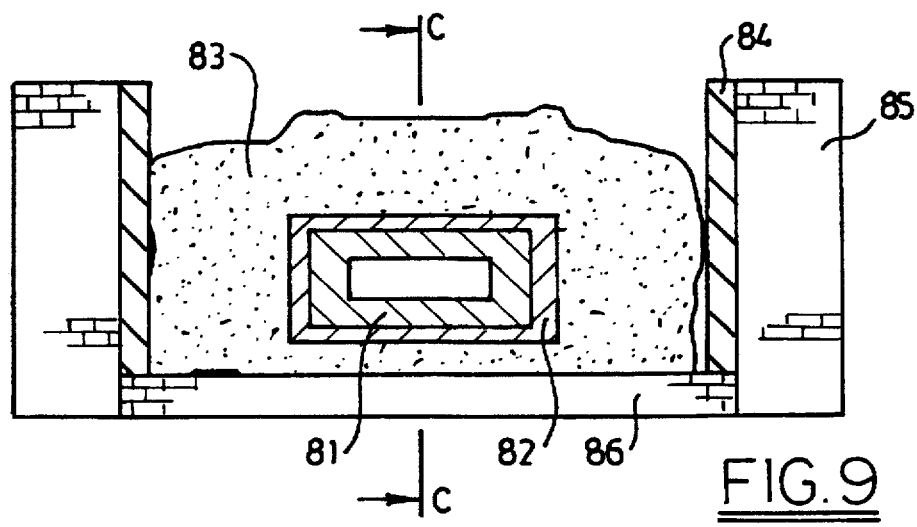
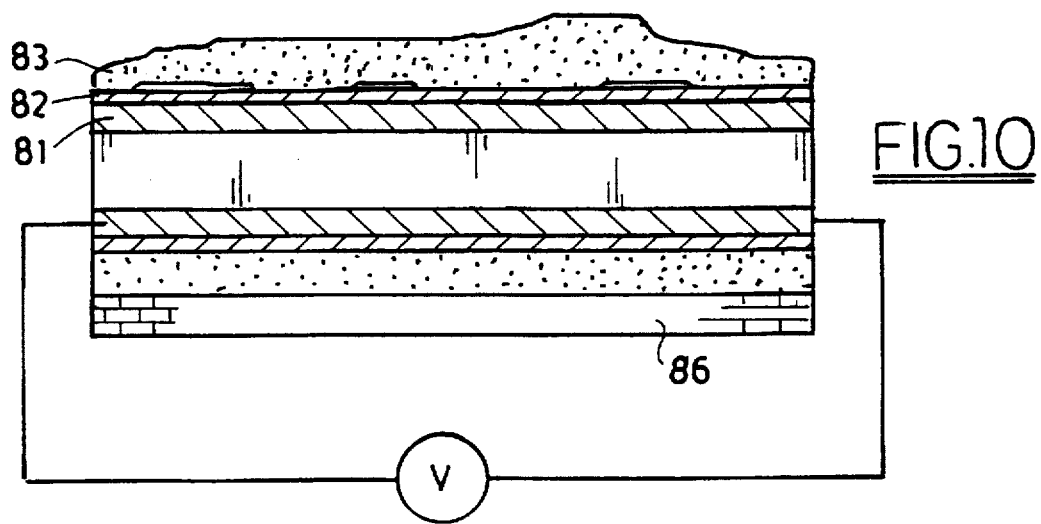

PROCESS FOR PREPARING CERAMIC FIBERS

FIELD OF THE INVENTION

A process for preparing a non-oxide ceramic fiber in which an oxide ceramic fiber is heated in the presence of a carbon-containing material and/or nitrogen containing material.

BACKGROUND OF THE INVENTION

Silicon carbide fibers, because of their excellent physical and mechanical properties, are widely used in industry. Thus, for example, silicon carbide fabric surfaces are preferred over silica fabrics as part of thermal protection system (TPS) for space shuttle vehicles since they survive higher heating loads than silica fabrics. For example, no observable deterioration was observed on the silicon carbide fabric surface at heating rate exposures of 37 W/m$^2$ whereas a silica fabric became brittle after exposure to 10 W/m$^2$. Also, the higher emissivity of silicon carbide over silica was found to be another advantage for higher temperature environments.

Silicon carbide fibers can be used as reinforcements to toughen ceramics for use at high temperatures; they are inherently more resistant to oxidation, have a high elastic modulus, have better creep resistance (the ability to carry load at high temperatures without substantial deformation), and finally they withstand gaseous and high temperature liquid corrosion products that have either alkaline or acidic characteristics. Of these desirable properties, their superior strength at elevated temperatures is of great value. In ceramic matrix composites where matrix failure precedes failure of the fiber bundle, these fibers carry the load and contribute to the so-called graceful failure of the composite. Essentially, instead of the catastrophic failure that one encounters in using monolithic ceramics, ceramic matrix composites with silicon carbide fibers as reinforcing agents have the ability to increase failure strain substantially so that the user is alerted and has time to either repair or replace the damaged area. Thus, catastrophic system failures can be avoided.

Currently, three classes of silicon carbide fibers have been produced. The first type of silicon carbide fiber is made via a chemical vapor deposition process in which silicon carbide is deposited on a carbon or a tungsten fiber core. This process has been taught in U.S. Pat. Nos. 4,068,037 and 4,702,960; the disclosure of each of these U.S. patents is hereby incorporated by reference into this specification. This fiber is made and marketed by Textron Specialty Materials Company of Lowell, Mass. This class of fibers utilizes a chemical vapor deposition (CVD) process, in which silicon carbide is coated on either tungsten or carbon filaments to produce large diameter filaments (100 to 150 microns in diameter). For this CVD process, various chlorosilanes or mixtures of chlorosilanes (including $CH_3SiC_3$, $(CH_3)_2SiCl_2$, and $CH_3SiHCl_2$) are used to produce the silicon carbide coating.

In the aforementioned CVD process, although the fiber produced has a mantle of silicon carbide in the form of beta-silicon carbide crystallites, this mantle often contains many other undesired species, including carbon, depending on the particular gases that are mixed with the silanes. Reference may be had, for example, to P. Martineau, M. Lahaye, R. Paileer, R. Nalsan, M. Couzi, and F. Cruege, "Silicon carbide Filament/Titanium Matrix Composites Regarded as Model Composites, Part 1, Filament Microanalysis and Strength Characterization", J. Mater. Sci. 19 [8]2731–48 (1984). Analytical studies have shown that the silicon carbide fibers produced by CVD are complex composite fibers which can vary considerably in composition and properties. See, for example, articles by P. Martineau et al. appearing in the Journal of Materials Science 19 [8]2371–48 (1984), by S. R. Nutt et al. appearing in the Journal of Materials Science 20[6]1953–60 (1985), and by J. A. DiCarlo appearing in the Journal of Materials Science 21 [1]217–224 (1986).

Another process for preparing silicon carbide fibers was developed by Yagima et al. who synthesized a polycarbosilane from dichloromethylsilane; see, e.g., U.S. Pat. No. 4,052,430. The disclosure of this United States patent is hereby incorporated by reference into this specification.

In the Yagima et al. process, polydimethylsilane was synthesized from dichloromethylsilane by chlorination with sodium metal in xylene solvent. This was then melt spun at 350 degrees centigrade to form a precursor fiber that was then heat treated in vacuum or an inert gas at 1000 degrees centigrade to produce a continuous filament containing beta-silicon carbide crystallites. This process produced a smaller diameter fiber compared to the large diameter fibers produced by the CVD process mentioned earlier.

The Yagima et al. process had been the most widely used polymer conversion process for making silicon carbide fibers. Other comparable processes are described in U.S. Pat. Nos. 4,534,948, 4,900,531, 4,117,457, 4,847,427, 4,743,662, 4,816,497, 4,220,600, 4,283,376, 4,342,712, 4,399,232, 5,082,872, 5,322,822, 5,283,044, 5,344,709, 5,167,881, and the like; the disclosure of each of these U.S. patents is hereby incorporated by reference into this specification.

All of these polymer conversion processes suffer from several major disadvantages. In the first place, they require the synthesis of a polymer precursor material which often has a complicated structure. In the second place, they require the spinning of this polymer precursor material into a fiber. In the third place, the spun fiber must be "cured" to effect cross-linking within the polymer to a specified degree; if this curing is not effected in a precise and proper manner, the fibers will fuse together when pyrolyzed. In the fourth place, the cured fiber must then be pyrolyzed at elevated temperatures to burn off the organic material; if the pyrolysis step is not done in a precise and proper manner, the fibers may rupture and/or substantial impurities may remain in the pyrolyzed fiber. Furthermore, during these steps, undesirable amounts of oxygen are often introduced into the fiber.

The "Nicalon" fibers, as they are usually referred to, do not possess the true stoichiometry of silicon carbide. The nature of the polymer pyrolysis used to make these fibers produces fibers that contain unreacted silicon, carbon, and oxygen at relatively high concentrations as major impurity constituents; see, e.g., T. J. Clark, M. Jaffe, J. Rabe and N. R. Langley, "Thermal Stability Characterization of Silicon carbide Ceramic Fibers: I, Mechanical Property and Chemical Structure Effects", pp. 901–913. Cer. Eng. & Sci. Proc. 7, 7–8 (1986).

Thus, the properties of these "Nicalon" fibers are such that their resistance characteristics with respect to exposure to high temperature, oxidizing or reducing environments, and the like are poor. These fibers dissociate into their constituents when exposed to such environments at temperatures greater than 1400 degrees centigrade, resulting in fiber degradation, loss of strength, and fiber integrity. This chemical and thermo-mechanical degradation feature is a major disadvantage, both during composite fabrication and later during composite use.

Presently, ceramic matrix composites are manufactured using either hot pressing or over-pressure sintering or pressureless sintering or a combination of these processes. Essentially, the manufacturing process involves exposure to temperatures substantially greater than 1400 degrees centigrade and pressures that can exceed one atmosphere depending upon practice. The degradation of the Nicalon fiber during manufacture of the ceramic matrix composite and the reaction of the released elements and compounds with those of the matrix constituents poses formidable barrier against the use of these fibers on a wider basis.

Because of the problems with the polymer-derived silicon carbide fibers, and the processes used to prepare them, a third class of silicon carbide fibers utilizing submicron silicon carbide powder as a raw material along with suitable polymeric binders that might include silicon carbide pre-ceramic polymer have been developed. These compositions are either melt spun or slurry spun into green fibers that are then sintered (using continuous sintering) at temperatures greater than 2000 degrees centigrade to yield polycrystalline sintered silicon carbide fibers. Reference may be had, e.g., to U.S. Pat. Nos. 4,908,340, 4,942,011, and 5,354,527, the disclosure of each of which is hereby incorporated by reference into this specification.

Although the submicron silicon carbide powder process is arguably better in some respects than the aforementioned polymer conversion processes, it suffers from its own substantial disadvantages. In the first place, a polymeric carrier also must be used in this process in order to produce a spinnable composition, and the organic polymeric material must then also be removed during further processing; if the polymer removal step is not properly and precisely conducted, the process will produce either unsintered fiber and/or low-density fiber. Furthermore, unless all of the process variables are consistently and strictly monitored and followed, fiber product with non-uniform shrinkage properties and density properties often will be produced. Because of the inordinate amount of processing and process control required for this product, it is relatively expensive.

It is an object of this invention to provide a process ceramic fibers with excellent physical properties.

It is another object of this invention to provide a process for producing ceramic fibers which is substantially less complex and expensive to run than prior art processes.

It is another object of this invention to provide a ceramic fiber which is substantially pure.

It is another object of this invention to provide a novel apparatus for producing a ceramic fiber.

It is another object of this invention to provide a continuous process for producing a ceramic fiber.

It is yet another object of this invention to provide a batch process for producing a ceramic fiber.

It is yet another object of this invention to provide a process for preparing ceramic whiskers.

It is yet another object of this invention to disclose a process to produce ceramic fibrous sheets and ribbons.

It is a further object of this invention to provide a process to produce ceramic composites containing ceramic fibers in sheet, plate, tubular, and other geometry.

It is another object of this invention to provide a process to produce monolithic non-oxide ceramics directly from silica and carbon preforms.

SUMMARY OF THE INVENTION

In accordance with this invention, a silicon dioxide fiber with a purity in excess of 99 percent is contacted with a source of elemental carbon and subjected to a temperature from 1,400 to about 2,300 degrees centigrade.

BRIEF DESCRIPTION OF THE DRAWING

The invention will be described by reference to the following drawings, in which like reference numerals refer to like elements, and in which:

FIG. 8 is a sectional view of the apparatus of FIG. 7;

FIG. 9 is a sectional view of another apparatus for producing a ceramic tube;

FIG. 10 is a sectional view of the apparatus of FIG. 9;

DESCRIPTION OF THE PREFERRED EMBODIMENTS

Figure 1:
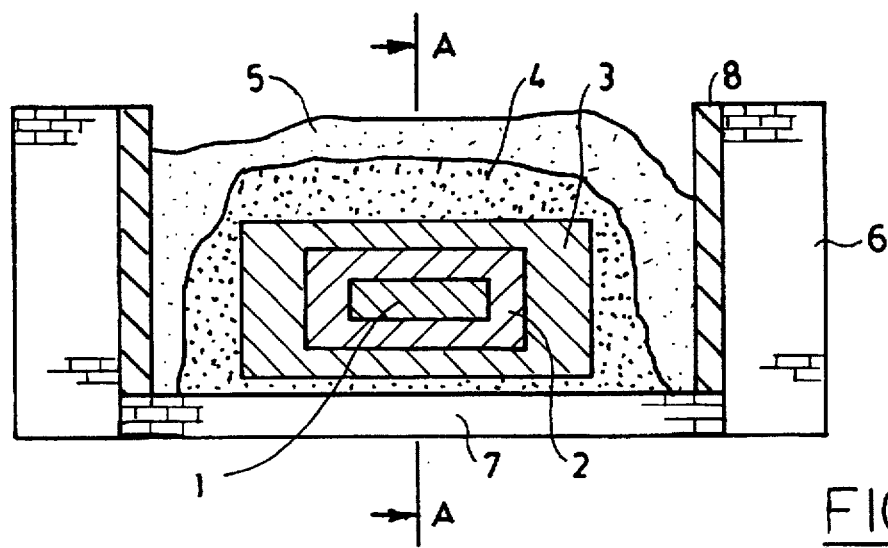
FIG. 1 is a schematic view of a preferred apparatus for practicing a batch process for producing ceramic fiber.

The process of this invention allows one to produce high-quality silicon carbide fiber by a relatively low-cost process. The raw materials used in the process are relatively inexpensive. The process utilizes a simple furnacing technique that involves self-heating of the charge. Most importantly, the process does not require either fiber spinning, fiber drawing, polymer chemical conversion, pyrolysis, sintering, or relatively expensive chemical vapor deposition (CVD) methods.

In one aspect of this invention, there is provided a method for producing silicon carbide fibers, whiskers, and fibrous whisker-containing composites.

In one preferred process of this invention, silica fiber is used as one of the starting materials. This fiber is well known to those skilled in the art and is described, e.g., in U.S. Pat. Nos. 5,381,229 (silica fiber and alumina fiber), 5,293,438 (silica fiber), 5,201,072 (silica and alumina fiber), 5,164,999 (alumina and silica fiber), 3,454,453 (silica fiber), 3,428,819 (silica fiber), 5,445,634 (quartz fiber), 5,370,642 (quartz), 4,812,654 (quartz fiber), and the like; the disclosure of each of these U.S. patents is hereby incorporated by reference into this specification.

As is known to those skilled in the art, silica fiber, and yarn and fabric products made from it, are readily commercially available. Thus, by way of illustration, one may use a "Silfa" silica yarn which is sold by the Ametex company of 900 Greenbank Road, Wilmington, Del. This material is preferably comprised of at least about 99.5 weight percent of silica and has a density of at least about 2.15 grams per cubic centimeter.

By way of further illustration, one may use silica yarn in addition to or instead of the silica fiber. Silica yarn is described, e.g., in U.S. Pat. No. 4,549,183, the disclosure of which is hereby incorporated by reference into this specification.

By way of further illustration, one may use silica fabric in addition to or instead of the silica fiber. Silica fabric is described, e.g., in U.S. Pat. Nos. 4,243,715, 3,853,576, and the like; the disclosure of each of these United States patents is hereby incorporated by reference into this specification.

Alumina fiber may be used instead of the silica fiber. Thus, e.g., one may use one or more of the alumina fibers disclosed in U.S. Pat. Nos. 5,201,082, 5,164,999, 4,101,615, 5,069,854 (alumina fiber with carbon inclusion), 5,320,791, 5,185,299, 5,104,713, 5,051,210, and the like; the disclosure of each of these U.S. patents is hereby incorporated by reference into this specification. One may also use an alumina fiber mat; see, e.g., U.S. Pat. No. 5,145,613. The disclosure this U.S. patent is hereby incorporated by reference into this specification.

In the preferred process of this invention, the main raw materials that react for making silicon carbide fibers and silicon carbide fiber mats consist of commercially available silica fibers, glass and quartz fiber mats, a single carbon source or a combination of carbon sources consisting of a variety of materials such as coal tar pitch, coal (anthracite, bituminous, etc.), petroleum coke, natural graphite, artificial graphite, carbon black, lamp black, acetylene black, furfural alcohol, and carbon-containing syrups such as corn-syrup. The carbon-containing substance can be in the solid, liquid, or vapor form such as carbon-containing gases such as hydrocarbons, and a mixture of these.

Figure 2:
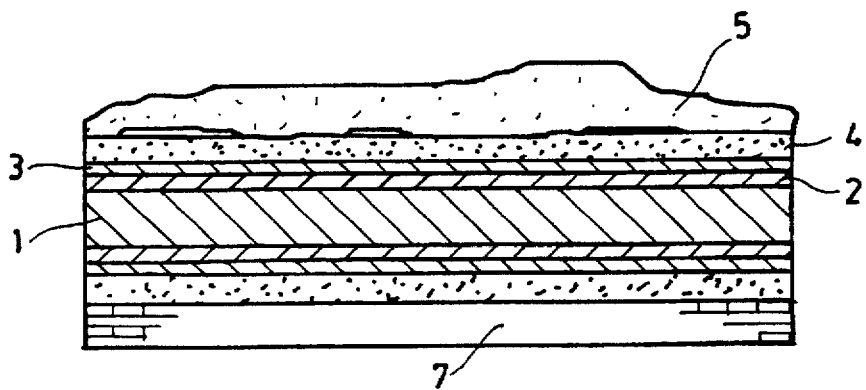
FIG. 2 is a sectional view of the apparatus of FIG. 1.

FIG. 1 is a schematic of a preferred furnace 1 which, preferably, is an electric resistance furnace. Referring to FIG. 1, it will be seen that the electric resistance furnace depicted in FIG. 1 is comprised of a central core 1 of a graphite element or a mix of petroleum coke element that has been pressed together. A high voltage current is passed through this resistance element using copper or other appropriate electrode using a transformer and other appropriate electrical circuitry. The cross section of the graphite or the pressed coke core can be circular, elliptical, square, rectangular, or any irregular shape. For making several individual and/or strands of fibers it may be preferable to use plate-like geometry of the current-carrying core such that maximizes fiber loading. Before the power is turned on, the charge is set up as follows:

The central graphite/coke core (1) is covered with a layer of carbon source (2) either by painting or by layering and building by packing. This layer is then covered with a layer of the high purity silica fibers either layered along the axis of the graphite core and/or wound around akin to filament winding of a mandrel such as used in the making of composite pressure vessels(3). The silica fiber-containing layer also contains, intermixed with the silica fibers, carbon source materials, either in solid or semi solid or liquid form. The silica fibers can also be coated with a slip containing carbon such as graphite mold wash materials that are used in metallurgical foundry. This assembly is then covered with a silica sand/coke mixture (4) that acts as insulation layer. Another layer of carbon black (5) that further acts as insulation between the graphite walls (8) and the support fire brick side walls (6) can also be a part of the furnace build. If needed, further fibrous ceramic insulation fiber blankets can also be placed between the graphite side wall and the fire brick side wall. Also, if required, a mixture of fine silica sand and petroleum coke can loosely cover the entire assembly on the top and sides. The whole assembly rests on a the floor on the top of fiber bricks (7). Then the electric power applied to this furnace on a programmed schedule depending upon the amount of the furnace charge. During the furnace run, the mixture of silica sand and petroleum coke as well as the carbon black will act as thermal insulator to keep the heat inside the furnace. A view from inside the loaded charge, section A—A is shown in FIG. 2.

Several layers of carbon/silica fiber alternative layers can be built to improve the furnace yield. Estimated temperature profile of the furnace gives guidance about the multi-layer furnace build. As can be realized, this process can be either scaled-up or scaled down depending upon product demand.

Once the reaction has been completed, the furnace power is turned off and the furnace is allowed to cool by natural air convection and radiation. The furnace is then dismantled and the fibers of silicon carbide are harvested. The loose mixture of fire sand which contains low amounts of silicon carbide and unused silica and carbon is then stored and re-used for the subsequent furnacing operation.

As described below, the conversion of silica fibers to silicon carbide fiber occurs by carbothermal reduction reactions involving temperatures in the range of 1400 to 2300 degrees centigrade. The product of this invention is silicon carbide fibers of discrete lengths and diameters that are dictated by the discrete lengths and diameters of silica fibers that were used as reactant materials in the process.

In a variation of the above process, silica fiber yarns are used instead of individual silica fibers as a reactant material used in the process. The product of this variation would be silicon carbide fiber yarns. In another process variation, silica or quartz cloth is used as one of the reactants in the process, with the resulting product being silicon carbide fibrous cloth.

In another embodiment of this process, braids of silica and carbon or graphite fibers are interwoven and such mixed silica-carbon (graphite) is used along with other carbon-containing material as reactants in the process as previously described. In this process, the resulting product is still silicon carbide; however, the carbon (graphite) fiber has provided additional carbon source for carbothermal reduction of silica fibers.

The resulting discrete silicon carbide fibers of this process can be chopped or otherwise sized to obtain silicon carbide whiskers. They can be also ground to fine particles. Such particles, because of the nature of small diameter fibers that are used in the process can lead to particles with sharp cutting edges which would be eminently suitable for use as abrasives for cutting and grinding and other tooling applications. To obtain such micro-grit abrasives by the traditional approaches would be costly since those are usually obtained by grinding super hard chunky silicon carbide grains through several grinding steps.

In the preferred process of this invention, a variety of silicon carbide fiber diameters can be obtained even in a single furnace run dictated by the fiber diameters available of the silica and quart fibers. These can range in sizes from one to hundreds of microns or greater.

The apparatus depicted in FIG. 1 is adapted to practice a batch process which uses silica fibers of finite lengths that are either layered along the axis of the electrode or the silica fibers of finite lengths may be wound around the electrode-carbon source in a coil fashion. This is a batch process of manufacturing fibers of finite, but variable lengths.

However, fibers can also be produced continuously where a variety of furnace configurations can be used, as necessary.

Figure 3:
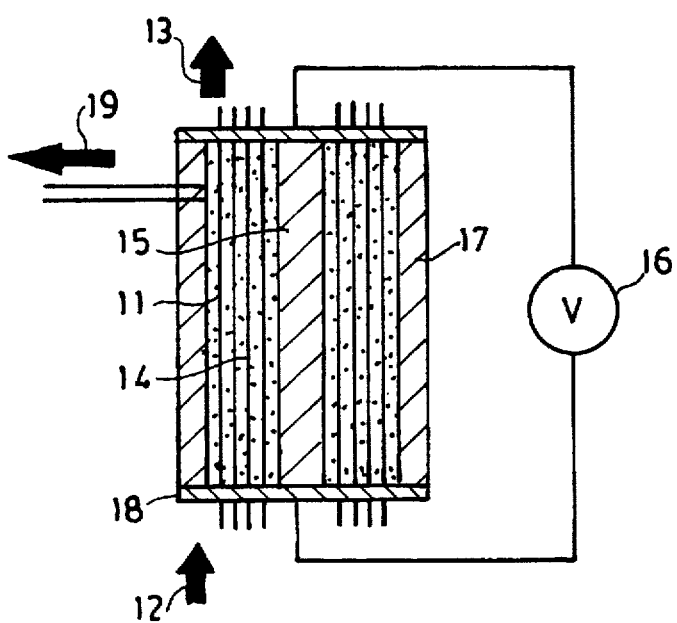
FIG. 3 is a sectional view of a preferred apparatus for practicing a continuous process for producing ceramic fiber.
Figure 4:
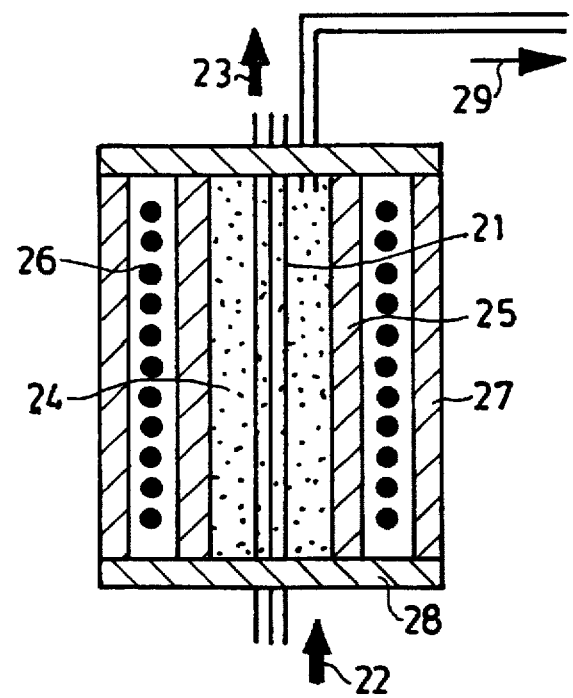
FIG. 4 is a sectional view of another preferred apparatus for practicing a continuous process for producing ceramic fiber.

An extension of the process involves continuous silicon carbide fiber production using either resistance heating of the charge FIG. 3, or induction as shown schematically in FIG. 4.

In an embodiment shown in FIG. 3, the silica fibers (11) are fed into the reaction furnace from bottom (12) to top (13) although this direction can be reversed in different situations. The silica fibers (11) are surrounded by carbon source materials (14) that are in either in the solid or semi-solid form in a very loosely packed configuration. Carbon-containing gases may also be continuously purged through the fluidized bed system. The charge that consists of the silica fiber (11) and carbon-containing material (14) is continuously heated by a graphite core (15) at the center of the furnace by resistive heating (16). Reaction temperature is between 1400 and 2500 degrees centigrade. The furnace is enclosed by water-cooled end plates (18) and furnace enclosure (17). It is realized that a variety of furnace configurations such as circular cylindrical configuration, or rectangular or cylinders of square cross section are possible. The furnace can be horizontal or in an inclined plane to the horizontal also. Also, the central graphite core (15) that carries the electrical current and heats the charge can have a variety of cross sections including, but not limited to, circular, elliptical, square, rectangular, polygon, and irregular cross section. The products of the reaction are continuous silicon carbide fibers and gaseous products consisting of sulfur dioxide and carbon monoxide and other volatile and non volatile gaseous products. The products of the reaction that are in the gaseous state are continuously exhausted (19).

The output of this process is a continuous silicon carbide fiber (13). The process as described herein is semi-continuous because although the fibers go through the furnace in a continuous manner, because carbon is consumed in the process for effecting the reduction of silica in a carbothermal reduction reaction as mentioned previously, at some point in the process, silica reduction will not take place. The furnace is then shut down and replenished with a fresh charge of carbon-containing materials. On the other hand, if the input fibrous reactant material consists of a mixture of silica and carbon fibers that were previously braided or otherwise inter-woven, then this modification of the process can result in making silicon carbide fibers in a continuous fashion.

In another embodiment shown in FIG. 4, the silica fibers (21) are fed into the reaction furnace from bottom (22) to top (23), although this direction can be reversed in different situations. The silica fibers (21) are surrounded by carbon source materials (24) that are in either in the solid or semi-solid form in a very loosely packed configuration. Carbon-containing gases may also be continuously purged through the fluidized bed system. The charge that consists of the silica fiber (21) and carbon-containing material (24) are continuously heated by a graphite outer tube core (25) which is heated by induction heating (26). Reaction temperature is between 1400 and 2500 degrees centigrade. The furnace is enclosed by water-cooled end plates (28) and furnace enclosure (27). The cross sectional view is shown schematically in FIG. 4. It is realized that a variety of furnace configurations such as circular cylindrical configuration, or rectangular or cylinders of square cross section are possible. The furnace can be horizontal or in an inclined plane to the horizontal also. The products of the reaction are continuous silicon carbide fibers and gaseous products consisting of sulfur dioxide and carbon monoxide and other volatile and non volatile gaseous products. The products of the reaction that are in the gaseous state are continuously exhausted (29).

The output of this process is a continuous silicon carbide fiber (13). The process as described herein is semi-continuous because although the fibers go through the furnace in a continuous manner, because carbon is consumed in the process for effecting the reduction of silica in a carbothermal reduction reaction as mentioned previously, at some point in the process, silica reduction will not take place. The furnace is then shut down and replenished with a fresh charge of carbon-containing materials. On the other hand, if the input fibrous reactant material consists of a mixture of silica and carbon fibers that were previously braided or otherwise inter-woven, then this modification of the process can result in making silicon carbide fibers in a continuous fashion.

It is realized that the above embodiments that utilize carbothermal reduction of silica fibers to silicon carbide fibers can be adapted to the preparation of silicon nitride fibers. In this case, a nitridation reaction step is added to the carbothermal reduction process. This type of carbothermal nitridation has been successful in converting silica particles into silicon nitride powders. My invention uses commercially available silica fibers to make silicon nitride fibers. In this process, any nitrogen-containing gas, such as ammonia, can also be used to facilitate the fiber conversion.

In a preferred process of this invention, silica fibers are used for direct carbothermal nitridation to make silicon nitride fibers. Thus, in the embodiments described in FIGS. 3 and 4, the reactant silica fibers can be reacted with nitrogen-containing gaseous reactants in conjunction with carbon-containing gaseous phases in order to achieve carbothermal reduction and nitridation of silica fibers into silicon nitride fibers.

In another embodiment, in a manner similar to the above embodiment, a process is disclosed here whereby aluminum nitride fibers can be made by using alumina fibers as a reactant for carbothermal nitridation of these fibers into aluminum nitride fibers. Thus in the embodiments described in FIGS. 3 and 4, alumina fibers can be substituted for silica fibers and nitrogen-containing gaseous reactants can be used in conjunction with carbon-containing gaseous phases in order to achieve carbothermal reduction and nitridation of alumina fibers into aluminum nitride fibers.

The embodiments described in FIGS. 3 and 4 use either semi-continuous or continuous mode of silicon carbide fiber preparation. An alternate method that can be used in a continuous mode of operation involves carbothermal chemical reduction as the operating mechanism and uses the following technique. Vertical or horizontal furnaces or furnaces that are inclined with respect to the horizontal floor are custom-built. Carbon-containing gases are passed through continuously in and around silica fiber bundles that are continuous and move through the furnace that are then be converted to silicon carbide.

In order to accelerate the reactions, such as $SiO_2+2C=Si+2CO$, $SiO_2+C=SiO+CO$, it may be preferable to add carbon in an amount slightly higher than the stoichiometric amount. Thus, the carbon or carbon-containing material may be utilized in up to about 10 percent of excess of the stoichiometric amount.

Figure 5:
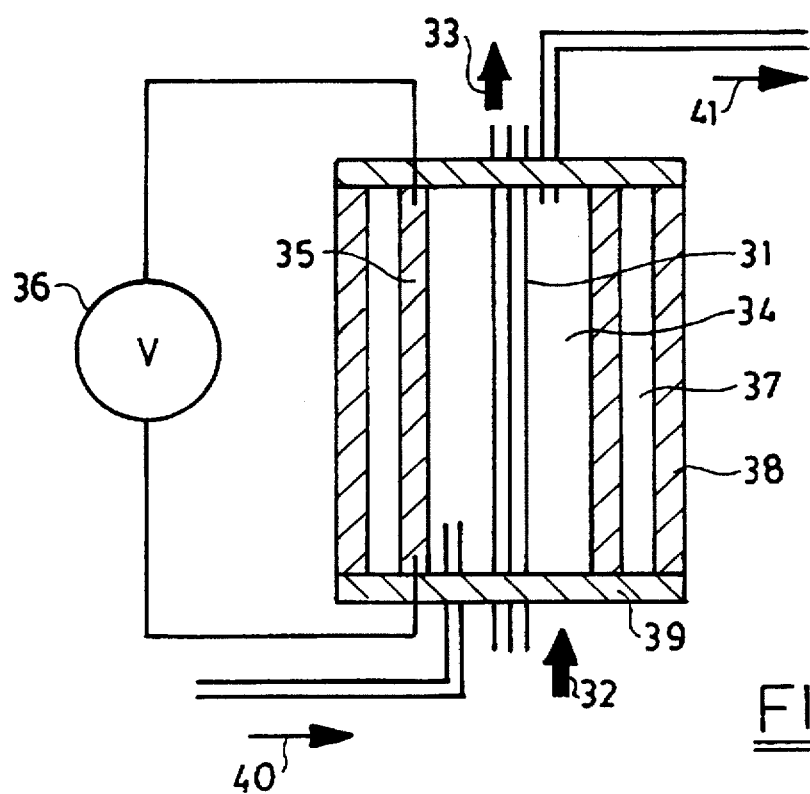
FIG. 5 is a sectional view of yet another preferred apparatus for practicing a continuous process for producing ceramic fiber.

An embodiment of the above-described process is shown in FIG. 5. Here, resistance heating of the silica fiber and the gaseous charge by graphite heating element in a tubular form is utilized. Silica fibers (31) are fed into the reaction furnace from the bottom (32) to top (33), although in different situations such direction can be reversed. These silica fibers (31) are reacted with carbon-containing gases (40) such as hydrocarbons like methane, ethylene, etc. or carbon monoxide, and may also be mixed with inert gases such as argon and perhaps hydrogen at temperatures in excess of 1400 degrees centigrade which is obtained by the resistive heating of the graphite tubular heating element (35) by means of appropriate electrical connections (36). The graphite resistance heating element is insulated with standard furnace insulation consisting of grafoil and other fibrous materials (37) and enclosed by water-cooled container walls (38) and end-plates (39). The gaseous products are exhausted from the furnace chamber at the top (41). The furnace can be horizontal or in an inclined plane to the horizontal also.

The silica fibers (31) used in this invention as a reactant raw material for the silicon carbide fiber production can be previously covered with carbon either by dip coating or by gaseous deposition techniques. In this case, the furnace is heated by cylindrical graphite resistance heaters that will form the periphery of the furnace cylinder. Argon or nitrogen is purged continuously to preserve the graphite heating element. The fibers can also be passed outside the graphite heating element that can be a solid cylinder or a hollow one with varying geometry such as a square, rectangle, polygon, or circular or an ellipse or of any irregular shape. In instances where the presence of silicon monoxide is required for conversion, provision can also be made to evaporate solid SiO and carry this using a carrier gas such as high purity argon. Also, hydrocarbons such as methane, ethylene, acetylene, either by themselves, or in combinations thereof, in addition to hydrogen, can also facilitate the production of continuous fibers by accelerating the carbothermal reduction reaction. The pressure of the reactive gas may be less than, equal to, or greater than the atmospheric pressure. Also, specific gaseous or vapor phase atmospheres can be established that use boron, and aluminum-containing additives in addition to carbon containing gas in order to further densify, strengthen and toughen the silicon carbide product.

Figure 6:
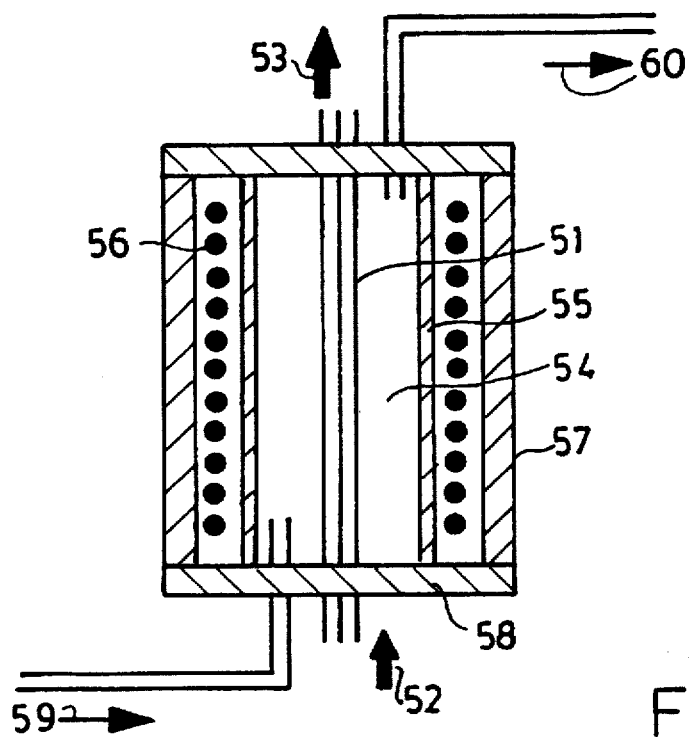
FIG. 6 is a sectional view of yet another apparatus for practicing a continuous process for producing ceramic fiber.

In a different embodiment of the above principle of silica fiber conversion to silicon carbide fibers, induction heating is utilized for furnacing operation. An embodiment of the above-described process is shown in FIG. 6. Here, resistance heating of the reactant silica fiber and the gaseous charge by induction heating of graphite outer tube is described. Silica fibers (51) are fed into the reaction furnace from the bottom (52) to top (53), although in different situations such direction can be reversed. These silica fibers (51) are reacted with carbon-containing gases (54) such as hydrocarbons such as methane, ethylene, etc. or carbon monoxide, and may also be mixed with inert gases such as argon and perhaps hydrogen. Reaction occurs at temperatures in excess of 1400 degrees centigrade obtained by radiative heating from the heated graphite tube (55), heated by induction (56). The furnace is enclosed by water-cooled container walls (57) and end-plates (58). The gaseous products are exhausted from the furnace chamber at the top (60). The furnace can be horizontal or in an inclined plane to the horizontal also.

A variation of the above-disclosed continuous fiber making operation is that the reactant silica fibers can be interbraided with carbon or graphite fibers before being fed into the silicon carbide ceramic conversion furnace. For continuous fiber making, in order to protect the graphite heating element use of air-lock facility is preferred. This area can be flushed with nitrogen using positive flow control.

Figure 7:
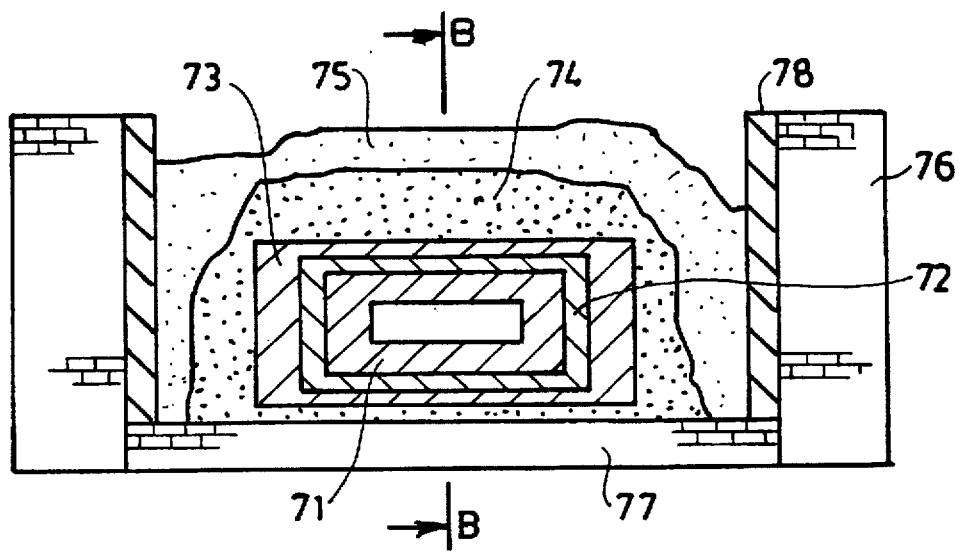
FIG. 7 is a sectional view of an apparatus for producing a ceramic tube.

In another embodiment of the invention shown in FIG. 1, ceramic silicon carbide articles with or without these silicon carbide fibers can be fabricated directly from raw material constituents. In the first instance, a process to make silicon carbide hollow tubes that contain silicon carbide fibers, will be described. The process is described in FIG. 7. The central graphite/coke core (71) can be either a solid cylinder or a hollow cylinder and has rectangular cross section in the schematic that is shown. The cylinder can be of any cross section desired of the final silicon carbide product, such as, but not limited to, circle, rectangle, square, hexagon or any polygon, and ellipse. It can also have fins arising from its outer surfaces. This central hollow graphite/petroleum coke core is covered with a layer of carbon source (72) either by painting or by layering and building by packing. This core is then covered with a layer of the high purity silica fibers either layered or wound along the axis of the graphite core and/or wound around akin to filament winding of a mandrel such as used in the making of composite pressure vessels (73). The silica fiber-containing layer also contains carbon source materials, either in solid or semi solid or liquid form as well as fine silica powder. The silica fibers can also be coated with a slip containing carbon such as graphite mold wash materials that is used in metallurgical foundry. This assembly is then covered with a silica sand/coke mixture (74) that acts as insulation layer. Another layer of carbon black (75) that further acts as insulation between the graphite walls (78) and the support fire brick side walls (76). If needed, further fibrous ceramic insulation fiber blankets can also be placed between the graphite side wall and the fire brick side wall. Also, if required, a mixture of fine silica sand and petroleum coke can loosely cover the entire assembly on the top and sides. The whole assembly rests on a the floor on the top of fiber bricks (77). Then the electric power applied to the graphite core on a programmed schedule depending upon the amount of the furnace charge. During the furnace run, the mixture of silica sand and petroleum coke as well as the carbon black will act as thermal insulator to keep the heat inside the furnace build. A view from inside the loaded charge, section B—B is shown in FIG. 8.

Once the reaction has been completed, the furnace power is turned off and the furnace is allowed to cool by natural air convection and radiation. The furnace is then dismantled and the silicon carbide tubular article containing silicon carbide fibers supported by silicon carbide grains is recovered simply by dislodging the product. The loose mixture of fire sand which contains low amounts of silicon carbide and unused silica and carbon is then stored and re-used for the subsequent furnacing operation.

As has been previously discussed, the conversion of silica fibers to silicon carbide fiber product occurs by carbothermal reduction reactions involving temperatures in the range of 1400 to 2300 degrees centigrade. The tubular product of this invention can contain silicon carbide fibers of discrete lengths and diameters that are dictated by the discrete lengths and diameters of silica fibers that were the initial reactant materials that were used as raw materials for the process.

In a variation of the above process, silica fiber yarns are used instead of individual silica fibers as a reactant raw material component. The tubular product of this embodiment would be silicon carbide tubes containing silicon carbide fiber yarns. In another process variation, silica or quartz cloth is used in the process, with the resulting tubular product containing being silicon carbide fibrous cloth in layered form that are bonded together by fine silicon carbide grains that result from this process.

In another embodiment of this process, braids of silica and carbon or graphite fibers are interwoven and such mixed silica-carbon (graphite) fibrous reactant raw material is used along with other carbon-containing material in the process as previously described. In this process, the resulting product is still silicon carbide tube; however, the carbon (graphite) fiber has provided additional carbon source for carbothermal reduction of silica fibers.

Yet another embodiment of the above process involves making open-ended silicon carbide tubes containing no silicon carbide fibers but grains of silicon carbide that are bonded together. Such a product is made of single crystals that have very high thermal conductivity and are fused together. In this invention, I disclose a silicon carbide tube making process directly from silica and carbon using carbothermal reduction chemical reaction process.

An embodiment of making tubes that consist of silicon carbide grains that are fused together is shown in FIG. 9. The central graphite/coke core (81) can be either a solid cylinder or a hollow cylinder and has rectangular cross section in the schematic that is shown; it can be of any cross section desired of the final silicon carbide product, such as, but not limited to, circle, ellipse, rectangle, square, hexagon or any polygon, and any irregular cross section. It can also have fins arising from its outer surfaces. This central hollow graphite/ petroleum coke core is covered with a layer of a mixture of fine silica sand intermixed with carbon source (82) and built by packing. This is then covered with a layer of carbon black (83) that further acts as insulation between the graphite walls (84) and the support fire brick side walls (85). If needed, further fibrous ceramic insulation fiber blankets can also be placed between the graphite side wall and the fire brick side wall. Also, if required, a mixture of fine silica sand and petroleum coke can loosely cover the entire assembly on the top and sides. The whole assembly rests on a the floor on the top of fiber bricks (86). Once the furnace has been built, electric power is applied to the graphite core on a programmed schedule depending upon the amount of the furnace charge. During the furnace run, the mixture of silica sand and petroleum coke as well as the carbon black will act as thermal insulator to keep the heat inside the furnace build. A view from inside the loaded charge, section C—C is shown in FIG. 10.

Once the reaction has been completed, the furnace power is turned off and the furnace is allowed to cool by natural air convection and radiation. The furnace is then dismantled and the silicon carbide tubular article containing silicon carbide grains that are fused together is recovered simply by dislodging the product. The loose mixture of fire sand which contains low amounts of silicon carbide and unused silica and carbon is then stored and re-used for the subsequent furnacing operation.

As described previously, the conversion of silica to silicon carbide tubular product occurs by carbothermal reduction reactions involving temperatures in the range of 1400 to 2300 degrees centigrade. The tubular product of this disclosure can be of a variety of discrete lengths and thickness as dictated by commercial demand.

In addition to the open-ended tube making process described above, the process can also be modified to produce closed-end tubes such as U-tubes, tubes with elbows and bends, etc. The graphite core configuration and the power input engineering will be dependent upon the size and shape of such tubular configurations.

Figure 11:
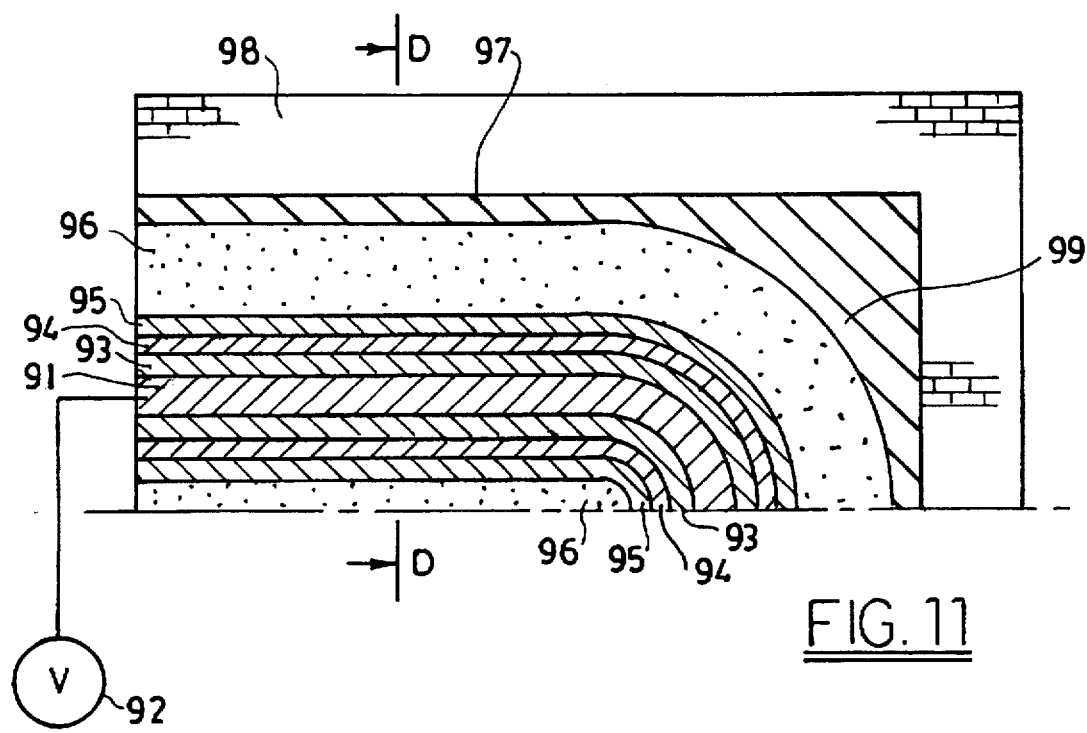
FIG. 11 is a sectional view of apparatus for producing ceramic U-tube.
Figure 12:
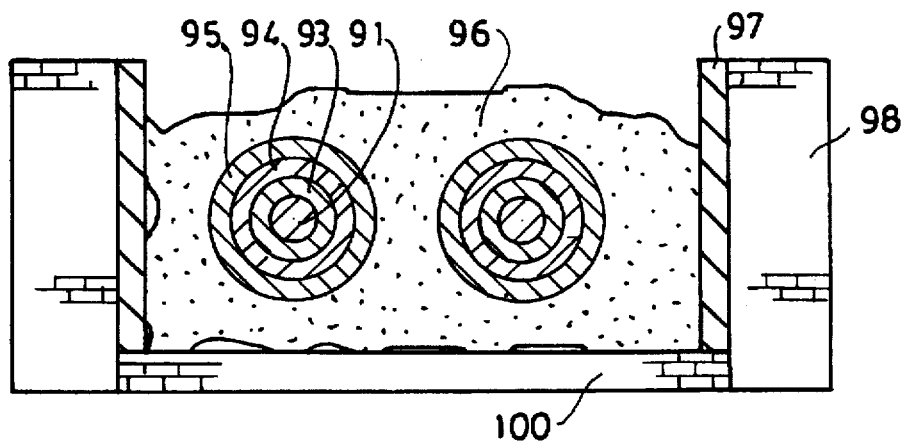
FIG. 12 is a sectional view of the apparatus of FIG. 11.

An embodiment for making a U-tube made of silicon carbide ceramic fibers with silicon carbide particles or grains is shown in FIG. 11. In this figure which shows a cross sectional top view of the furnace, only half of the furnace is reproduced for clarity with the central line shown in the figure. The graphite core (91) is of U-configuration and is of circular cross section. In reality, any cross sectional shape can be utilized depending upon the need. This graphite core is heated by resistive heating (92), by utilizing appropriate electrical circuitry that can generate temperatures up to 2600 degrees centigrade. The graphite core (91) is then covered with a thin layer of carbon source material (93) which is then covered with a layer of silica fibers either by themselves or inter-mixed with carbon-graphite fibers or other carbon-containing solid or semi-solid or liquid material (94) as well as fine silica sand. Surrounding this all around is a mixture of carbon-containing material and silica sand (95). This layer is further covered with carbon black and a mixture of electrical insulation (96) that will prevent electrical path across the U-shaped core. The furnace is protected by graphite walls (97) and then with fire brick wall (98). In one-end, the distance between the fire brick wall and the graphite wall can be covered with thermally insulating fibrous materials. (99). A view from inside the loaded charge, section D—D is shown in FIG. 12. Here, the furnace bottom (100) made of fire brick is also shown.

Once the reaction has been completed, the furnace power is turned off and the furnace is allowed to cool by natural air convection and radiation. The furnace is then dismantled and the silicon carbide tubular article containing silicon carbide grains that are fused together is recovered simply by dislodging the product. The loose mixture of fire sand which contains low amounts of silicon carbide and unused silica and carbon is then stored and re-used for the subsequent furnacing operation.

As described previously, the conversion of silica to silicon carbide tubular product occurs by carbothermal reduction reactions involving temperatures in the range of 1400 to 2300 degrees centigrade. The tubular product of this disclosure can be of a variety of discrete lengths and thickness as dictated by commercial demand.

These tubes can be used as thermal wells, thermocouple protection tubes, and depending upon the porosity achieved in the process as high temperature particular filters in coal gasification power generation systems, diesel particular filters and other similar applications.

Figure 13:
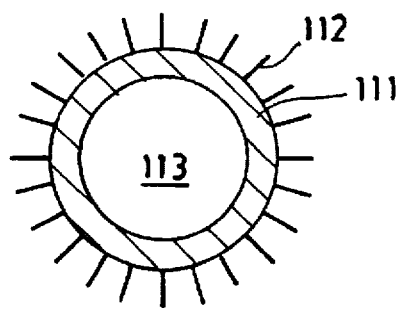
FIG. 13 is a schematic view of a ceramic tube with external fins.

One other embodiment will be disclosed here which is relevant to making finned ceramic radiant tubes with very high surface area that can radiate heat in heating molten metal and molten glass baths. Because the overall process technology disclosed by my invention converts silica and quartz cloths into silicon carbide cloths, these cloths can be attached to the outer surface of a silicon carbide fiber ceramic tube, all made in one process. In the present invention, silicon carbide sheet heat conductors protrude out of silicon carbide fibrous tubes. Because of their higher temperature capability, the present invention offers a variety of special industrial and scientific applications that involve dissipation of heat in still air or other hostile industrial processing atmospheres. The cross section of the final product is shown in FIG. 13. The source of heat such as burner (113) is inside the silicon carbide fiber/silicon carbide particle tube (111) which has silicon carbide sheets or fins (112) protruding from the surface of tube (111) which have been made together in the process disclosed here.

The development of low-cost, high quality silicon carbide fibers produced by this invention that uses relatively straight-forward technique forms the foundation for the manufacture of a variety of components in many industries. Such fibers will find commercial use in heat exchangers and chemical reactors subject to high-temperature, high-pressure, and highly corrosive environments. Other applications include: waste heat recovery air preheaters in aluminum re-melt facilities, ceramic radiant tubes in aluminum melting and holding furnaces, ferrous heat treatment furnaces, and applications in high-temperature incineration of municipal and industrial waste systems. These fibers can also be potentially useful in the manufacture of hazardous and toxic waste containment vessels. These silicon carbide ceramic fibers can also be made into chain curtains either during the carbothermal reduction process as practiced by this invention or by subsequent braiding operation of the fibers resulting from this invention. These special curtains can be hung before the uncovered opening of a furnace. This will then effectively cut down on heat, glare, gases and sparks which escape (thus contributing to safety) during a furnace operation. It also keeps the outside cold air from entering the furnace. Thus savings can be realized in fuel consumption because heat loss from radiant heat from the furnace is reduced. Because the curtains are made of silicon carbide chains or cloths, that withstand serve corrosive atmospheres encountered in furnace operations, these can be selectively installed inside furnaces to separate temperature zones.

Advantage of porous silicon carbide fiber-containing composite is that it is inherently more resistant to cracking induced by thermal loads and thereby can exhibit improved resistance to thermal spalling. Therefore, the articles made of this invention are amenable to use as furnace walls, mufflers, abrasives, and rocket nozzles. Also, the process is eminently suitable to make tubes that can be used as high-temperature filters in coal-gasification power generation systems and the like. Tubes with U-configuration and other specialized configuration can be constructed using this process.

The silicon carbide fibers and fibrous products of this invention can be used for crucibles, boats and processing tubes in the semiconductor industry where higher temperatures are used for heat treatment. Other applications for products derived from this invention include rocket nozzles, solid, fluid gas, and compounds containing a mixture of these transfer nozzles that have to accommodate constant and variable pressure in any application.

The silicon carbide cloths produced from this invention can be used in thermal protection systems instead of silica cloths due to its superior resistance to increased thermal exposure rates and superior emissivity characteristics when compared with such properties for the currently used silica cloths.

The fibrous products of this invention may be used as thermocouple protection tubes in high temperature environments, protective tubes that can house metallic and ceramic heating elements and igniters used in appliances such as dryers as well as high temperature kilns and furnaces.

The process lends itself to the making of products of a variety of size and shape capabilities. Plates of silicon carbide fiber containing ceramic composites made of this process can be used as furnace furniture with superior higher temperature bending strength and creep resistance. Thus, furnacing capacity can be increased allowing remarkable improvements in furnace throughput Also, silicon carbide fiber containing silicon carbide composite plates, in relatives thin structures can be used as liners of refractory materials. Such use will help contain the heat within the furnace more because of the higher thermal emissivity of silicon carbide. In addition, the improved corrosion resistance will increase the useful life of refractory walls, roofs and furnace bottoms.

The advantages of this invention over existing silicon carbide fiber making technology include: 1) low-cost production relative to existing technology due to the use of low-cost readily available raw materials and novel furnacing technique involving relatively low technology that can be practiced world-wide, 2) crystalline silicon carbide fiber that will withstand high temperature (>1400 degrees centigrade) use, 3) relatively high flexibility in scale-up or scale-down to large or small volume production dictated by market demand, and 4) the process imposes no processing-related restriction on the fiber diameter. Rather, it is dictated by the raw material that is used and the process is applicable to all available silica containing fibers and fiber and whisker mats that can be used as reactant materials.

In applicant's preferred process, in which silica fiber is used, the silica fiber preferably has the purity and density properties described elsewhere in this specification. It also preferably has an aspect ratio (the ratio of its length to its diameter) of at least about 30; its diameter is preferably from about 1 to about 100 microns and, more preferably, from about 10 to about 20 microns. During the preferred process, the silica fiber and the carbon source are subjected to a temperature of from about 1,400 to about 2,300 degrees centigrade (and preferably from about 1,800 to about 2,200 degrees centigrade) for at least about 0.5 hours.

In applicant's preferred process, from about 3.2 to about 5 moles of carbon from the carbon source are used for each mole of silica in the silica fiber.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

I claim:

1. A process for preparing silicon carbide fiber by the carbothermal reduction of silica fiber, comprising the steps of:
  (a) contacting silica fiber with a source of elemental carbon to produce a reactant mass, wherein:
    1. said silica fiber is comprised of at least about 99.5 weight percent of silica,
    2. said silica fiber has a density of at least about 2.15 grams per cubic centimeter,
    3. said silica fiber has a diameter of from about 1 to about 100 microns and an aspect ratio of at least about 30, and
    4. from about 3.2 to about 5.0 moles of carbon are present in said carbon source for each mole of said silica;
  (b) subjecting said reactant mass to a temperature of from about 1,400 degrees centigrade to about 2,300 degrees centigrade for at least about 0.5 hours.

2. The process as recited in claim 1, wherein said silica fiber has a diameter of from about 10 to about 20 microns.

3. The process as recited in claim 2, wherein said reactant mass is subjected to a temperature of from about 1,800 to about 2,200 degrees centigrade for at least about 5 hours.

4. The process as recited in claim 3, wherein said source of carbon is comprised a graphite heating element.

5. The process as recited in claim 4, wherein said source of carbon is comprised of coal tar.

6. The process as recited in claim 4, wherein said source of carbon is comprised of petroleum coke.

7. The process as recited in claim 3, wherein, while said reactant mass is subjected to said temperature of from about 1,800 to about 2,200 degrees centigrade, it is covered with a layer of material comprised of silica sand.

8. The process as recited in claim 7, wherein said layer of material is also comprised of petroleum coke.

9. The process as recited in claim 3, wherein said silica fiber is continuously moved through a bed comprised of said source of elemental carbon while it is subjected to said temperature of from about 1,800 to about 2,200 degrees centigrade.

10. The process as recited in claim 9, wherein said silica fiber is moved through said bed at a rate of at least about one foot per minute.

11. The process as recited in claim 1, wherein said source of elemental carbon is a gas.

12. The process as recited in claim 11, wherein said gas is a hydrocarbon gas.

13. The process as recited in claim 12, wherein said hydrocarbon gas is ethylene.

14. The process as recited in claim 11, wherein said gas is comprised of methane.

15. The process as recited in claim 14, wherein said gas is comprised of hydrogen.

* * * * *